Patented Feb. 11, 1941

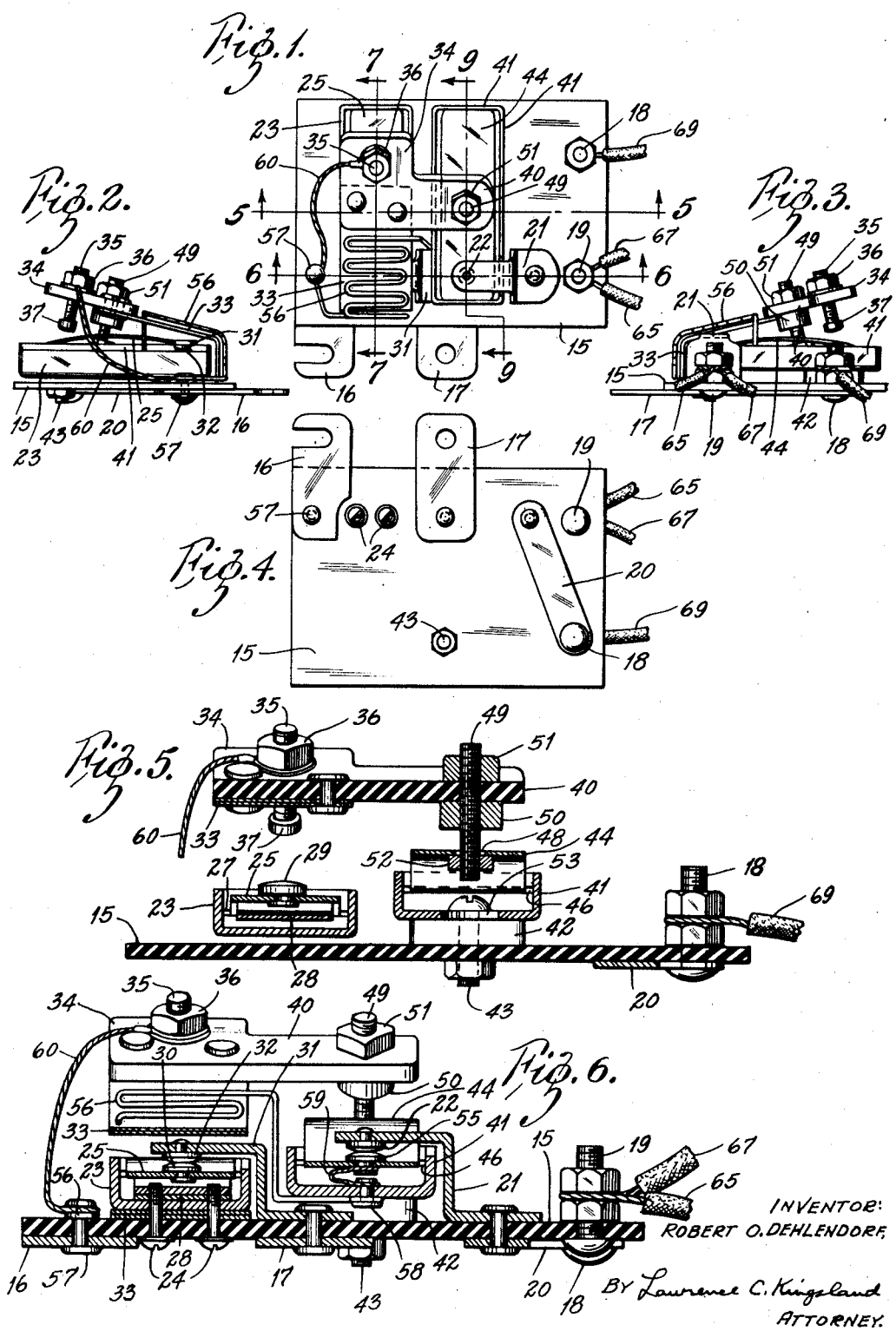

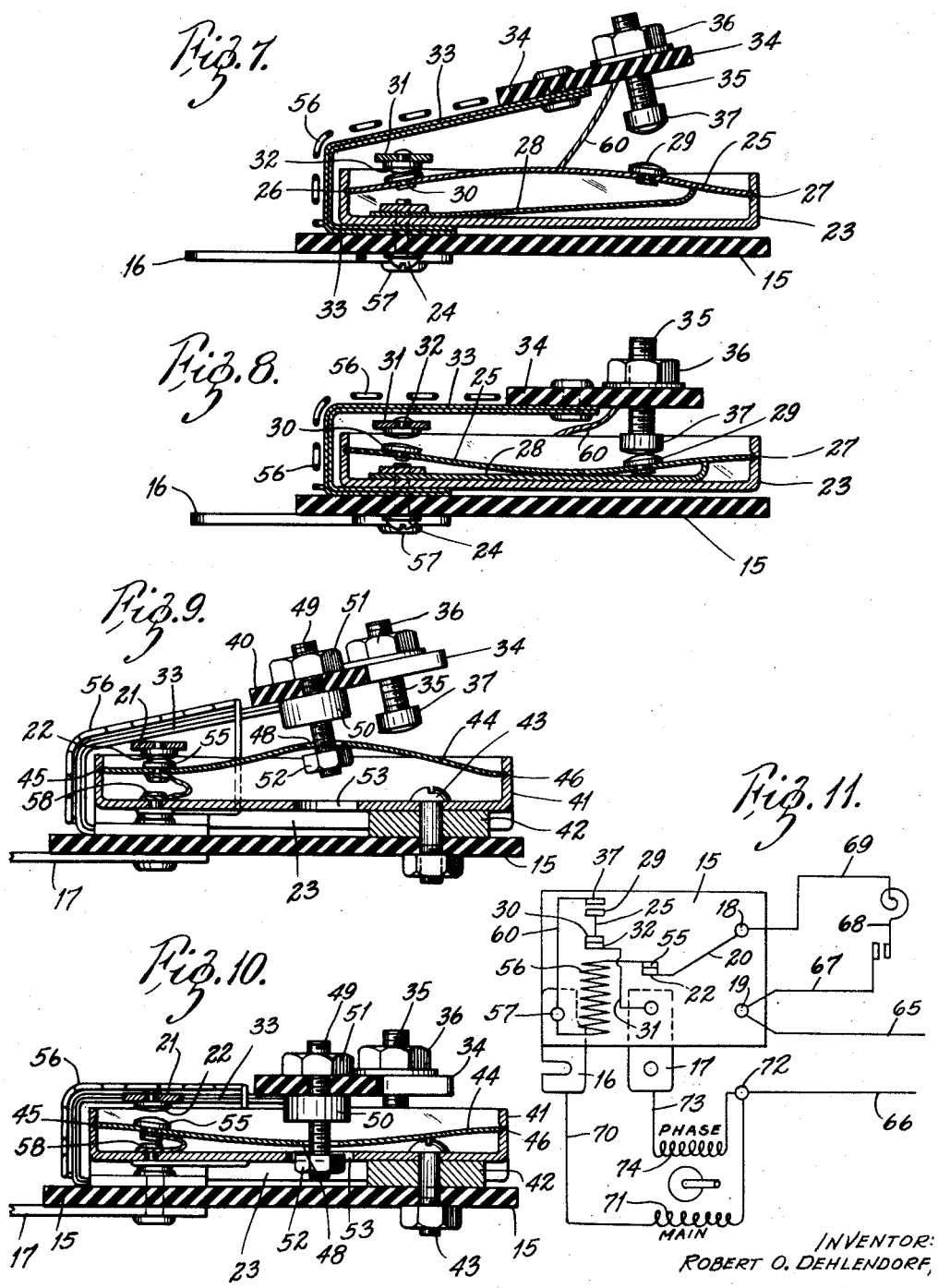

2,231,463

UNITED STATES PATENT OFFICE 2,231,463

HEAT ACTUATED SWITCH

Robert O. Dehlendorf, University City, Mo., assignor to The Emerson Electric Mfg. Co., St. Louis, Mo., a corporation of Missouri Application August 13, 1937, Serial No. 158,856

5 Claims. (Cl. 200—122)

The present invention relates to a thermal relay. It includes a snap action switch mechanism that is closed upon initial application of heat, is subsequently opened upon increased application of heat and which has, in combination, a second switch opened upon a further application of heat. Desirably it is used in connection with the starting of a motor and is so connected into the circuit that it is closed by application of heat to its heater when the motor switch is closed through the main windings. The heat thus produced causes the first closing of the switch to energize the phase windings whereby the motor is started. Continued application of heat opens the first switch to cut the phase windings out of circuit as the motor comes up to speed. Then, should there be an excess of current in the main windings, such as may occur when the motor is blocked or overloaded, additional heat is generated by the heater and causes the second switch to open and thereby completely to disconnect the motor from the circuit. Upon the latter disconnection the switch is designed so that the first switch passes through its cycle of operation and ultimately is opened prior to the reclosing of the second switch.

It is an object of the invention to provide a thermal switch including a heater wherein the switch is first closed upon application of heat, subsequently opened upon application of additional heat and, with an additional switch opened upon further application of heat.

It is a further object of the invention to provide two snap action switch devices operated by a single thermostat and designed to operate in the manner above described.

It is a further object of the invention to provide a switch, as previously described, wherein the operations are adjustable.

It is a further object of the invention to provide a method of controlling a motor circuit by heat produced from the current flowing through the windings.

In the drawings:

Fig. 1 is a plan view of the switch;

Fig. 2 is an elevation viewed from the left of Fig. 1;

Fig. 3 is an elevation viewed from the right of Fig. 1;

Fig. 4 is a bottom view;

Fig. 5 is a vertical section on the line 5—5 of Fig. 1;

Fig. 6 is a vertical section on the line 6—6 of Fig. 1;

Fig. 7 is a vertical section on the line 7—7 of Fig. 1, but showing the first switch open in its initial stage;

Fig. 8 is a view similar to Fig. 7, but with the first switch open in its third stage;

Fig. 9 is a vertical section on the line 9—9 of Fig. 1 with the second switch closed;

Fig. 10 is a section similar to Fig. 9, but with the second switch open; and

Fig. 11 is a wiring diagram of the motor control circuit.

The switch includes a base 15 from which extend two terminal receiving conductors 16 and 17. There are also provided on the base terminals 18 and 19. A conductor 20 leads from the terminal 18 on the bottom of the plate 15 to a contact-holding element 21 having a contact 22 thereon (Fig. 6).

An elongated cup-like member 23 is held by screws 24 to the plate 15. Between opposite ends of the member 23 is located a flexible spring blade 25, the ends of which engage in notches 26 and 27 wherefore it is bowed within the member 23. A spring plate 28 is held down at one end of the member 23 by means of the bolts 24. The other end of this spring 28 acts against the spring plate 25 to bow it upwardly as shown in Fig. 7. The spring 25 has on it contacts 29 and 30. A bracket 31 is secured to the base 15 by the rivet holding the terminal 17, and is in electrical circuit with the terminal. The bracket 31 has on it a contact 32 that is adapted to have the contact 30 brought against it.

A bimetal strip 33 is also held by the bolts 24 and is bent around the end of the cup-like member 23 so that when at normal temperatures it occupies the position of Fig. 7. An outer insulating element 34 is attached to the bimetal strip 32. A screw 35 is threaded through the member 33 and secured in proper adjusted position by means of a nut 36. The screw 35 at its outer end has a contact head 37 adapted to come in contact with the contact 29 of the spring 25.

The member 34 has a lateral extension 40 for a purpose to be described.

A second elongated cup-like member 41 is secured to the base 15 alongside the member 23. It is preferably spaced above the member 15 by a spacer element 42, there being a bolt 43 passing through the member 41, the spacer 42 and the base 15 to secure these several parts together. A spring blade 44 is located between the opposite ends of the member 41 and engages in notches 45 and 46. As shown, the spring 44 is longer than the space between the notches 45 and 46 and, therefore, is bowed. There is a hole 48 through the spring 44.

The extension 40 of the member 34 overlies the second cup-like member 41. Through this extension there is threaded a screw 49 having a threaded washer 50 thereon on one side of the extension 40 and a nut 51 on the opposite side of the extension 40. The washer 50 may thus be adjusted to any suitable position on the screw 49. The nut 51 is adapted to maintain the screw in adjusted position. A second nut 52 is provided on the underside of the spring 44. It may be forecast that the spring 44 is thus actuated into up or down position by the nut 52 or the washer 50. An opening 53 may be provided through the bottom of the member 41 to permit full movement of the nut 52.

The spring 44 carries a contact 55. This contact cooperates with the fixed contact 22.

A heater 56 is looped adjacent the bimetal 32. One end of this heater is connected to a rivet 57 that holds the contact 16 wherefore it is in conducting relationship with the contact. The other end of the heater extends to a rivet 58 on a cup-like member 41 which is connected by a flexible lead 59 to the contact 55 on the spring 44.

A flexible lead 60 extends from a terminal consisting of a rivet 57 to the screw 35 and is held thereon beneath the nut 36.

In connecting the switch, power lines 65 and 66 are introduced. Power line 65 is brought to the terminal 19 and from this terminal there extends a line 67 to the thermostat switch 68. A line 69 leads from this switch to the terminal 18, wherefrom the circuit is carried through the conductor 20 to the terminal 22. Thence it may continue through the terminal 55 and the heater 56 to the terminal 57. From the terminal 57 it passes through the terminal 16 and a line 70 into the main winding 71 of a refrigerator motor, or the like, and thence to the terminal 72 and the other power line 66.

From the rivet 57 the circuit also may close through the lead 60 to the contact 37; thence to the contact 29 through the spring 25 to the contact 30; thence to the contact 32 and via the bracket 31 to the terminal 17 whence it may pass by the line 73 through the phase windings 74 of the motor and to the terminal 72.

The operation of the device is as follows:

This explanation will be facilitated by treating it in connection with the diagram of Fig. 11 that represents a refrigerator motor circuit such as is employed in connection with compressors. The thermostat 68 will be located within the refrigerator and the main and phase (or starting) motor windings, of course, will be located in the motor.

At the start the contacts 22 and 55 are closed together as are the contacts 30 and 32. The contacts 29 and 37 are, however, open. This position of the switch is represented in Figs. 7 and 9.

When the thermostat 68 closes because of increase of heat in the box, the circuit is closed as follows: power line 65, terminal 19, lead 67, thermostat switch 68, lead 69, terminal 18, conductor 20, contact 22, contact 55, heater 56, terminal 57, terminal 16, lead 70, main winding 71, terminal 72 and power line 66. It will be observed that the other circuit from the terminal 57 through the lead 60 is open at the terminal 37. The current is thus introduced into the main windings.

However, since the motor is not self-starting, a large current will pass through the main winding owing to the absence of any dynamic impedance within the motor. This high current will pass through the heater 56 and cause the same to generate a large amount of heat. This heat acts directly upon the bimetal 33 whereupon the same bends down toward the base 15. It first makes the contact 37 against the contact 29. When this occurs, the originally described circuit continues but, in addition, the phase circuit from the terminal 57 is closed as follows: terminal 57, lead 60, contact 37, contact 29, spring blade 25, contact 30, contact 32, bracket 31, terminal 17, lead 73, phase winding 74 and terminal 72. The phase winding is, therefore, closed into the circuit in parallel with the main winding whereupon the motor starts. In the brief period prior to actual start of the motor, the phase winding in parallel may add to the amount of current flowing through the heater 56 with which heater both windings are in series. As the motor comes up to speed, however, the amount of heat generated is reduced because of the back E. M. F. of the windings.

As the heat continues to be applied to the heater 56, the bimetal will further bend and the screw contact 37 will apply a pressure to the spring 25 through the contact 29, displacing the spring toward the bottom of the cup 23. The blade 25 will warp and, in the manner usual in such springs, will snap after passing over a center to part the contacts 30 and 32, as shown in Fig. 8. The spring 28 resists this movement and acts to keep the contact 29 against the contact 37 although the contact 30 is snapped away from the contact 32. As will appear hereafter, the showing of Fig. 8 obtained at the exaggerated heat condition and the break of contacts 30 and 32 takes place prior to the complete deflection of the bimetal shown in Fig. 8.

As soon as the contacts 30 and 32 are open, the phase windings are cut out of circuit. The motor, however, is by this time up to speed and is kept running by the main winding. In the event that the thermostat opens because the refrigerator has attained a proper degree of cooling, the heater is of course cut out of circuit, as are both of the windings, and the motor stops. The bimetal 33 then cools and returns to the position of Fig. 7; and the spring 25 snaps back under influence of the spring 28 to its original position, closing the contacts 30 and 32.

In the event that the motor is overloaded or blocked, when the thermostat is closed either prior to starting or after it has started, the back E. M. F. of the windings will be either eliminated or greatly reduced, as a consequence of which an excessive current will flow through these windings. Since both are in series with the heater 56 and in parallel with each other, there will be a greatly increased current flowing through the heater. In consequence of this, the bimetal will bend not only sufficiently to close the contacts 37 and 29 and open the contacts 30 and 32, but will bend to the position of Figs. 8 and 10. In this condition the washer 50 will act upon the second spring 44 forcing it downwardly toward the bottom of the cup member 41. As soon as the spring 44 passes a center point, it will snap with the position of Fig. 10 and will sharply part the contact 55 from the contact 22 in so doing. This opens the entire circuit of both windings and heater, whereupon the heater cools and the bimetal again begins its return to the position of Figs. 7 and 9. In this action the second spring 44 is not immediately returned, it not having any return spring such as 28, but, rather, being dependent upon the action of the nut 52. The nut 52 is so spaced that the spring 25 acts before the spring 44 returns. Consequently the return operation closes contacts 30 and 32 prior to the return of the spring 44 which latter closes contacts 55 and 22. If this latter provision were not made, and the contacts 22 and 55 closed prior to closing of the contacts 30 and 32, a cycling operation would take place because of the fact that the phase windings would never be cut into circuit in order to restart the motor. In other words, as soon as the contacts 22 and 55 were closed the heater 56 would again heat excessively with the phase windings out of circuit and the main windings carrying a large current, again to open contacts 55 and 22. In the present case, when the block or overload occurs, the heater will act first to open the entire circuit and then the switch will be returned to the position wherein the phase windings are put in circuit to restart the motor as soon as the block is relieved. Of course, as long as the block or overload continues, there will be enough heat generated in the heater to keep the second spring 44 down and the contacts 55 and 22 open.

The normal running current of the main windings is insufficient to heat the heater 56 to such a point that the bimetal shifts the second spring 44, but is adequate to maintain the first spring shifted to open contacts 30 and 32.

The time interval during which the starting winding is in circuit may be controlled by the resistance of the spring blade 25 and the spring 28 to movement. The adjustment of the screw 35 also affects this period. The operation of the second blade 44 in both directions is controlled by the adjustment of the washer 50 and the nut 52.

In the foregoing, the switch has been described in connection with the refrigerator circuit. It is, of course, equally applicable to any analogous type of circuit wherein a motor for main and starting windings is involved. Likewise the switch may be used in separate connections where its particular cycle of application may be desired.

What is claimed is:

1. In a switch mechanism, a power transmitting element, a thermal device for moving the element, a first spring blade, means to support the blade in bowed position adjacent the element to be shifted overcenter, a first switch including a contact on the element adapted to close with the blade, a second switch including a fixed element adapted to be closed with the blade when the spring is in its first position, a second spring blade, means to support it in bowed position to be shifted overcenter, a third switch including a fixed contact adapted to close with the second blade in one position of the latter, and means to actuate the thermal device to move the element to close the first switch, and upon further movement to shift the first blade to open the second switch, and finally upon still further movement to shift the second blade and actuate the third switch.

2. In a switch mechanism, a base, a pair of spring blade supports, a pair of spring blades, each suspended in bowed relation by contacting at its opposite ends with the support means, and shiftable across center to bow in an opposite direction, a bimetal strip having a movable end overlying one of the blades, a heater for actuating the bimetal, a contact adjustably attached to the bimetal to move therewith, a pair of contacts on the first blade, one of which cooperates with the contact attached to the bimetal, a fixed contact cooperable with the second blade contact, spring means constantly urging the spring blade toward the bimetal, an extension attached to the bimetal and overlying the second blade, an adjustable projection on said extension having abutments, one on each side of the second blade and said abutments being adjustable whereby to obtain desired movement of the second blade, a switch contact on the second blade, and a fixed contact cooperable therewith.

3. In a switch mechanism, three terminals, a power means, an electrical means for influencing the power means, a first switch and a second switch operated by the power means, the second switch and the electrical means being connected between two terminals, the first switch being connected between one of said two terminals and the third terminal, the first switch being normally open and the second switch being normally closed, and the power means under action of the electrical means being adapted to close the first switch upon partial energization of the electrical means, and to open the second switch upon additional energization thereof.

4. In a switch mechanism, an actuating means, a pair of bowed-spring switch blades adjacent said means, an abutment on said means to actuate the first switch blade, an abutment on the means to actuate the second blade, a return abutment on the means to return the second blade, said several abutments being independently adjustable.

5. In a switch mechanism, a switch blade normally bowed in one direction, a first contact toward one end of said switch blade, a second contact toward the other end of the blade, a fixed contact with which said second contact is engaged when the blade is in its initial position, a power means movable toward and from said blade, said power means having thereon a contact engageable with the first blade contact, said power means being adapted to move so that its contact is contiguous to the corresponding one on the blade so that both pairs of contacts are closed and upon further movement to shift the blade to a second position wherein the first blade contact is parted from the fixed contact.

ROBERT O. DEHLENDORF.